(12) United States Patent
Jung et al.

(10) Patent No.: US 8,810,328 B2
(45) Date of Patent: Aug. 19, 2014

(54) CIRCUIT ARRANGEMENT FOR INDUCTIVE ENERGY TRANSFER

(75) Inventors: Philipp Jung, Griesheim (DE); Joachim Lepper, Usingen (DE); Jan Christian Langsdorf, Oberursel (DE); Thomas Hohmann, Gelnhausen (DE)

(73) Assignee: Braun GmbH, Kronberg (DE)

( * ) Notice: Subject to any disclaimer, the term of this patent is extended or adjusted under 35 U.S.C. 154(b) by 150 days.

(21) Appl. No.: 13/314,552

(22) Filed: Dec. 8, 2011

(65) Prior Publication Data

US 2012/0112845 A1 May 10, 2012

(30) Foreign Application Priority Data

Jun. 9, 2010 (WO) ................. PCT/EP2010/003461

(51) Int. Cl.
*H03B 1/00* (2006.01)
*H02J 5/00* (2006.01)

(52) U.S. Cl.
USPC ................. 331/167; 331/117 R; 331/117 FE; 307/104; 307/39; 307/126

(58) Field of Classification Search
CPC .................................... H03B 1/00; H02J 5/00
USPC .................... 331/111, 113, 143, 167; 363/17; 307/104, 126, 39
See application file for complete search history.

(56) References Cited

U.S. PATENT DOCUMENTS

| 8,054,651 | B2* | 11/2011 | Pollard | 363/17 |
| 8,446,046 | B2* | 5/2013 | Fells et al. | 307/104 |
| 8,581,443 | B2* | 11/2013 | Jung et al. | 307/104 |

FOREIGN PATENT DOCUMENTS

| DE | 197 52 174 A1 | 7/1998 |
| DE | 198 41 972 A1 | 3/2000 |
| GB | 2 094 574 A | 9/1982 |
| JP | 3 270655 A | 12/1991 |
| JP | 6 054454 A | 2/1994 |
| JP | 10 189369 A | 7/1998 |

OTHER PUBLICATIONS

European Search Report for PCT/EP2010/003460—Case Z-8337MCQ—dated Jun. 9, 2010.

* cited by examiner

*Primary Examiner* — Arnold Kinkead
(74) *Attorney, Agent, or Firm* — Vladimir Vitenberg

(57) ABSTRACT

A circuit arrangement for the inductive transfer of energy is disclosed. The circuit arrangement includes an oscillator; and a device for detecting the load of the oscillator and for setting the circuit arrangement into one of multiple operating states depending on the detected load. The device determines the load of the oscillator using an electrical variable occurring in the oscillator.

14 Claims, 6 Drawing Sheets

CIRCUIT ARRANGEMENT FOR INDUCTIVE ENERGY TRANSFER

CROSS REFERENCE TO RELATED APPLICATIONS

This application is a continuation of International Application No. PCT/EP2010/003460, filed Jun. 9, 2010, the substance of which is incorporated by reference in its entirety herein.

FIELD OF THE INVENTION

The present disclosure relates to a circuit arrangement for inductive energy transfer for small electrical devices, for example for an electric toothbrush or an electric shaving apparatus.

BACKGROUND OF THE INVENTION

Battery-operated small electrical devices are typically charged at an external charging station. Contactless charging stations that inductively transmit electric energy from the charging station to the device are known in the art. For this, an alternating magnetic field is generated in the charging station by an oscillator that includes a coil element and a capacitor element, wherein the coil element simultaneously forms the primary coil of an inductive transformer and the secondary coil of the transformer is arranged in the device to be charged. The charging station is therefore conventionally designated as the primary side and the device to be charged is designated as the secondary side. Such a charging station in which the oscillator is operated with a stabilized voltage or, respectively, oscillates with a uniform amplitude is known from JP 6-54454 A.

Modern charging stations typically have three operating states. The first state is the operating mode in which the secondary side continuously draws power, for example, to operate the device or to charge a cell installed in the device. The second state is the simple standby mode in which the device is not located in the charging station, thus in which no power whatsoever is drawn. The third state is what is known as the extended standby mode in which the device is located in the charging station but only requires power intermittently, for example, because—although the cell is fully charged—it must occasionally be recharged to compensate for the self-discharge or for the device's own power consumption. In the latter instance, the charging station should switch back and forth between the simple standby mode and the operating mode as needed. The respective operating state of the charging station (primary side) is thus determined by the power demand of the small electrical device (secondary side).

It is known to detect the power demand of the secondary side directly at the secondary side, to transfer corresponding information to the primary side and to adjust the oscillator—meaning, for example, the base emitter voltage of a transistor operating in the oscillator—accordingly. This solution is quite complicated because transmission means for the information from the secondary to the primary side are required. Alternatively, the power demand of the secondary could be determined by measuring the power consumption of the oscillator (at the primary side) and controlling the oscillator accordingly. However, both variants are poorly suited to the setting of multiple operating states because the power consumption of the charging station is only slightly affected by the power consumption of the device due to the typically weak coupling between the primary and secondary side of the transformer.

As such, there is a need to specify a circuit arrangement for inductive power transfer from a primary side to a secondary side that may establish the power demand of the secondary side at the primary side in a simple manner.

SUMMARY OF THE INVENTION

In one embodiment, a circuit arrangement for the inductive transfer of energy is provided. The circuit arrangement includes an oscillator; and a device for detecting the load of the oscillator and for setting the circuit arrangement into one of multiple operating states depending on the detected load. The device determines the load of the oscillator using an electrical variable occurring in the oscillator.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

DETAILED DESCRIPTION OF THE INVENTION

Figure 1:
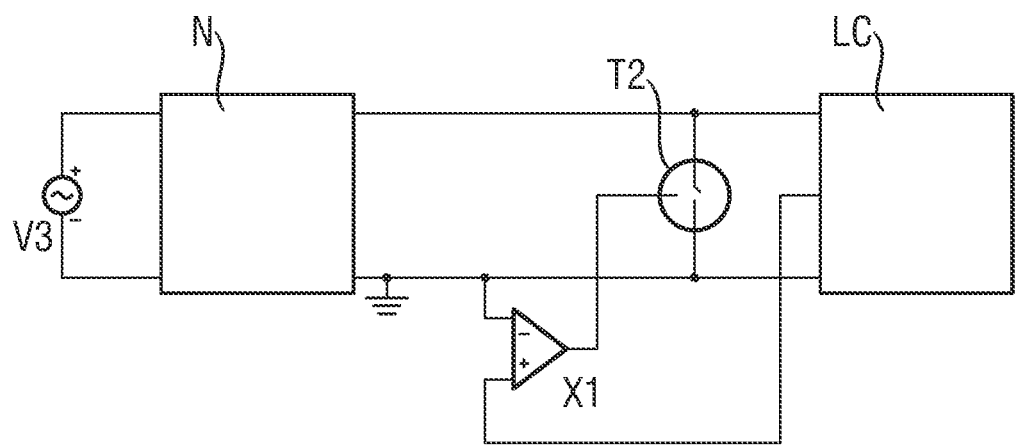
FIG. 1 shows a block diagram of a circuit arrangement for inductive energy transfer according to embodiments shown and described herein.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

According to the present disclosure a circuit arrangement for the inductive transmission of energy is provided. In one embodiment, the circuit arrangement has an oscillator and a device to detect the load of the oscillator and to switch the circuit arrangement into one of multiple operating states (for example a standby mode or an operating mode) depending on the detected load, wherein the device is designed to evaluate an electrical variable in the oscillator. In one embodiment, the oscillator is a Colpitts oscillator or a Hartley oscillator and has an active element known per se. The device for detecting the load of the oscillator evaluates an electrical variable in the oscillator, for example, a voltage at a terminal of the active element.

The active element is, for example, a transistor that is preferably operated in common-base configuration. The device for detecting the load of the oscillator preferably evaluates a voltage at a collector or at the base of the transistor, for example a semioscillation with a predetermined polarity. Preferably, the amplitude or the mean value of the negative voltage at the collector or at the base of the transistor is evaluated. Namely, the amplitude of the half-wave of the oscillator oscillation varies particularly strongly depending on the secondary side load. The load of the oscillator—and therefore the power demand of the secondary side—may thus be determined at the primary side using an electrical variable that is detectable in the oscillator. The device compares the detected load with a reference value and, depending on the result of the comparison, adjusts the operating state of the circuit arrangement, for example by activating a controllable switch with which the circuit arrangement may be switched from a standby mode into an operating mode or vice versa.

The switching from standby mode into the operating mode and vice versa may, for example, take place by switching the supply voltage of the oscillator via a controllable switch. For example, if the circuit arrangement has a power adaptor with a complex input resistance (in one embodiment, a capacitive series resistance), the non-reactive power consumption of the circuit arrangement may, for example, be varied by terminating the output of the power adaptor with a comparably small resistance by means of the controllable switch (standby mode). The mains then experiences an essentially capacitive reactive load that is defined by the capacitive series resistance. However, the capacitive series resistance of the power adaptor may also be variable via the controllable switch, for example by switching the capacitance of the capacitive series resistance. However, the oscillator may also have a damping element that is variable via the controllable switch, meaning that the power consumption of the oscillator may be switched. In standby mode the oscillator may either be so significantly attenuated by the damping element, that the oscillator oscillates but only with a small amplitude, or it may be so strongly equalized that the oscillator represents a comparably small load resistance for the power adaptor, and the power consumption from the mains is determined by the capacitive series resistance of the power adaptor, thus essentially comprising a reactive power.

In order to satisfy the EU 205/32 Guideline it is sufficient if the power consumption of the circuit arrangement in standby mode is lower than the power consumption in the operating mode only as an average over time. Accordingly, the oscillator in standby mode may, for example, operate intermittently, meaning that it oscillates intermittently with lower amplitude and otherwise oscillates with the larger amplitude typical in operating mode.

The described circuit arrangements are particularly suitable for use in inductive charging stations for small electrical devices, for example for electric toothbrushes, electric shaving apparatuses or communication devices (mobile telephones).

The block diagram according to FIG. 1 shows a circuit arrangement with a power adaptor N and a self-oscillating oscillator LC that serves to generate an alternating magnetic field. In one embodiment, the oscillator has a coil that serves to transmit inductively electrical energy from the oscillator LC (primary side) to a load (secondary side) not shown in the Figure, for example, a small electrical device that for this purpose contains a receiver coil that may be coupled to the coil of the oscillator. The oscillator draws electrical energy from the mains V3 via the power adaptor N, which has a complex input resistance. The circuit arrangement also has a controllable switch T2 and a device X1 for detecting the load of the oscillator LC, which device X1 controls the switch T2. The complex input resistance of the power adaptor N may be switched via the controllable switch T2 so that the circuit arrangement consumes a lower non-reactive power from the mains V3 in a standby mode than in an operating mode. The controllable switch T2 may be realized, for example, by a relay or a transistor that may be activated electrically or optically.

Figure 2:
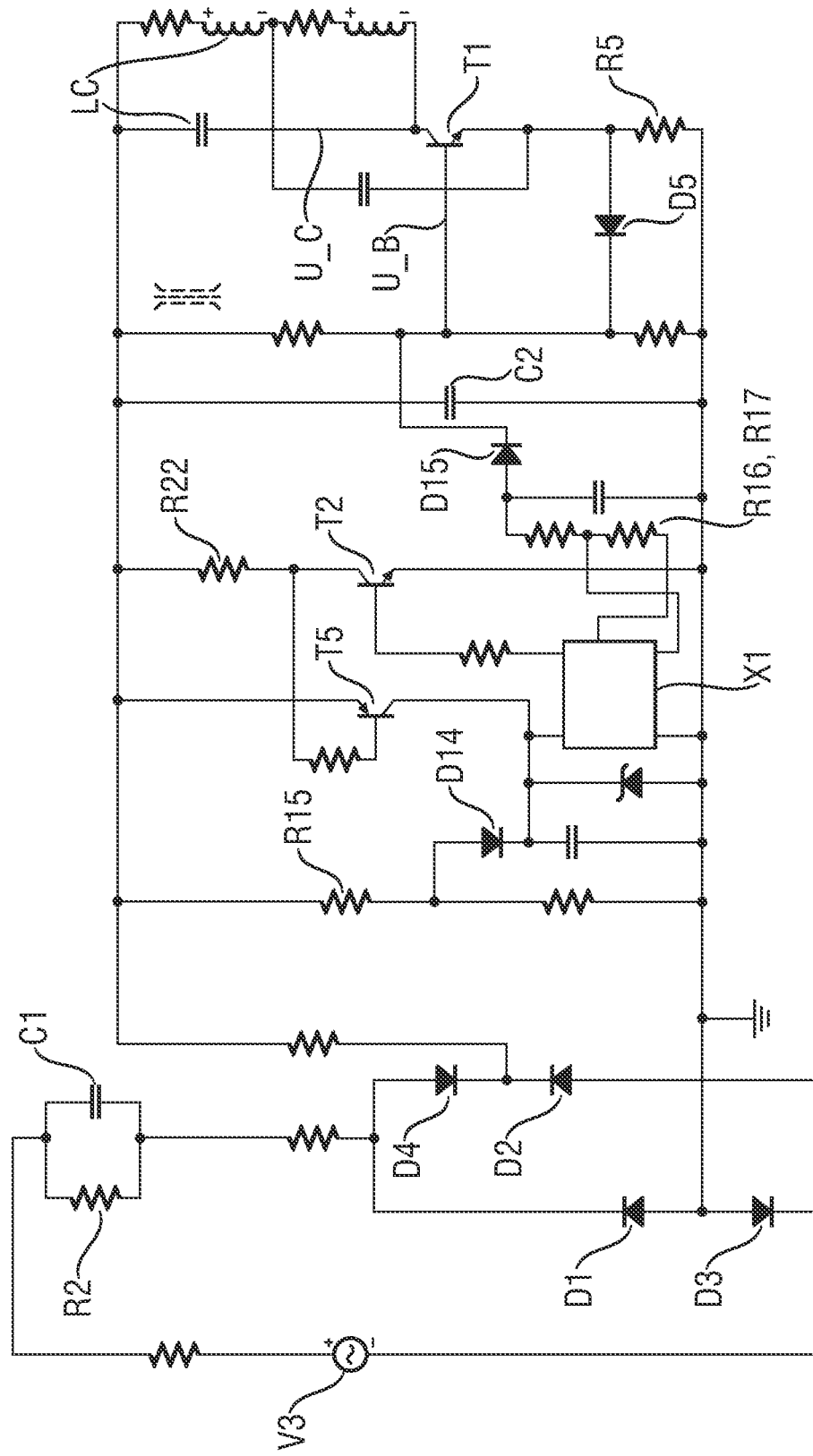
FIG. 2 shows a first circuit arrangement with a Hartley oscillator according to embodiments shown and described herein.

In the circuit arrangement shown in FIG. 2, the power adaptor includes a capacitor C1 as a capacitive series resistance and a rectifier bridge with diodes D1, D2, D3, D4 which, together with a capacitor C2, generates from the alternating mains voltage a smoothed direct voltage with which the oscillator LC is operated. A resistor R2 is connected in parallel with the capacitor C1, which resistor R2 ensures that the capacitor C1 is discharged after the power adaptor has been disconnected from the mains V3. The resistor R2 is relatively high-resistance in comparison to the non-reactive resistance of the capacitor C1, such that the complex input resistance of the power adaptor is essentially defined by the capacitive resistance of the capacitor C1.

If the circuit arrangement should be placed in standby mode, the capacitive series resistance is connected to ground via the rectifier bridge and a transistor T2 and a resistor R22. The power consumption of the circuit arrangement from the mains is thereby shifted from the non-reactive power range in the direction of the reactive power range, and a reduction of the non-reactive power consumption from the mains is thus achieved. If the transistor T2 is completely conductive, the current is essentially limited by the resistor R22 and the capacitor C1. If the resistance value of R22 is zero, the oscillator is completely disconnected from the energy supply. The mains then experiences a purely capacitive reactive load. However, the resistor R22 may be dimensioned so that, given a conductive transistor T2, a voltage is set at the capacitor C2 that is still sufficient for operation of the oscillator, wherein this then still oscillates but with a reduced amplitude.

In one embodiment, the oscillator LC included the circuit arrangement is a Hartley oscillator in common-base configuration that has a transistor T1 as an active element. For detection of the load of the oscillator by the secondary side, a device X1 (a microcontroller, for example) is provided, as well as a diode D15 and a voltage divider that is formed by the resistors R16 and R17. The negative half-wave of the base voltage U_B of the transistors T1 is applied at one end of the voltage divider R16, R17. This voltage U_B is fed via the diode D15 and represents the load of the oscillator LC. A positive reference voltage that is generated by the microcontroller X1 is applied at the other end of the voltage divider R16, R17. The voltage at the center tap of the voltage divider R16, R17 is supplied to the microcontroller X1. The negative base voltage U_B of the transistor T1 is transformed by means of the voltage divider R16, R17 into the positive voltage range so that it may be compared with a reference value by the microcontroller X1. The microcontroller X1 activates the transistor T2 depending on the result of this comparison.

Instead of the negative half-wave of the base voltage, the negative half-wave of the collector voltage U_C may also be evaluated.

The microcontroller X1 is also supplied with energy from the power adaptor via a voltage divider with a resistor R15, a diode D14 and a transistor T5 when the transistor T2 is conductive and the circuit arrangement is in standby mode. As soon as it establishes an increased power demand of the secondary side, it will disable the transistor T2 again. The microcontroller X1 may be provided with a control program which, for example, switches the transistor T2 on and off according to a predetermined time schedule.

Figure 4:
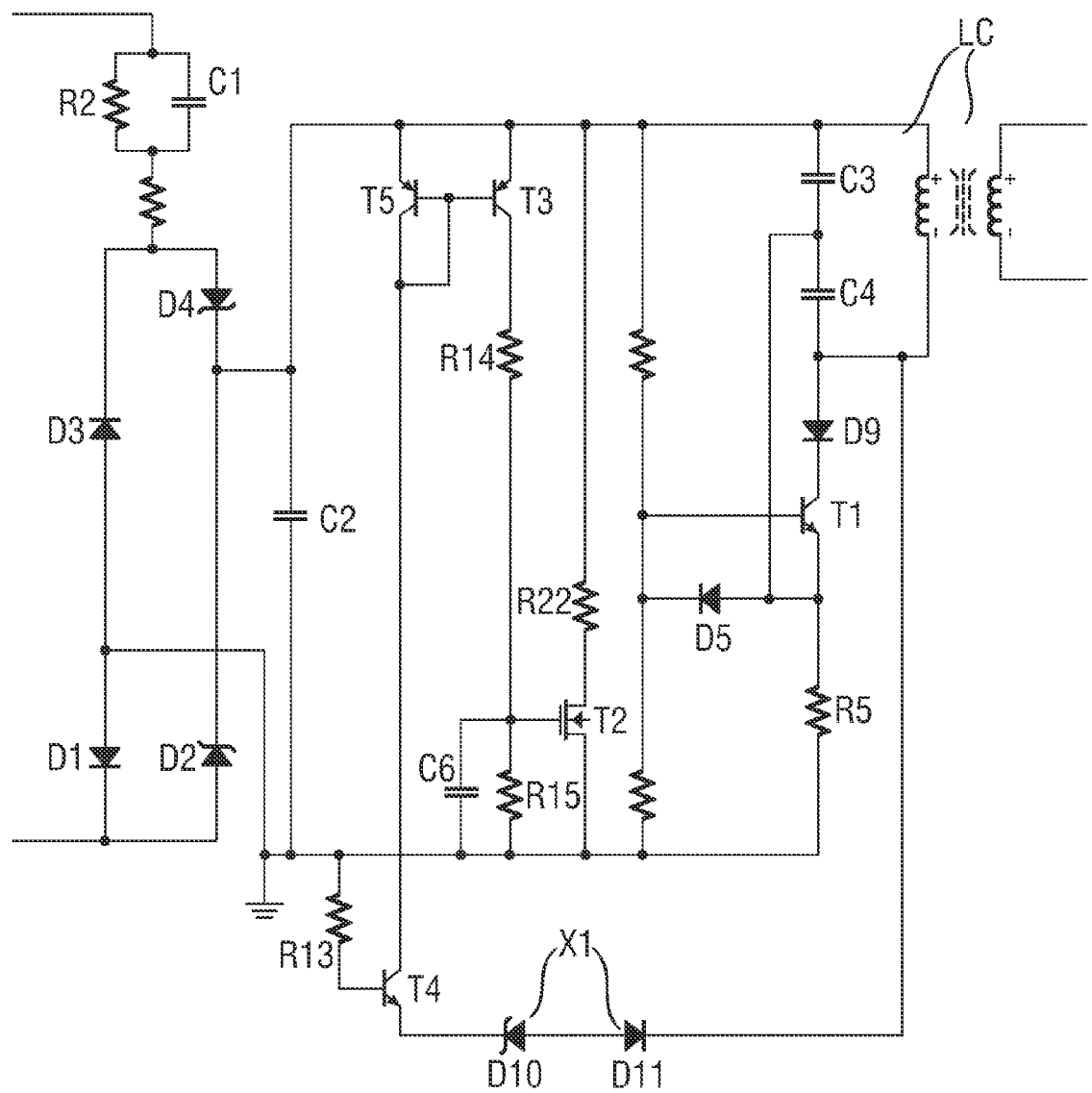
FIG. 4 shows a first circuit arrangement with a Colpitts oscillator according to embodiments shown and described herein.
Figure 5:
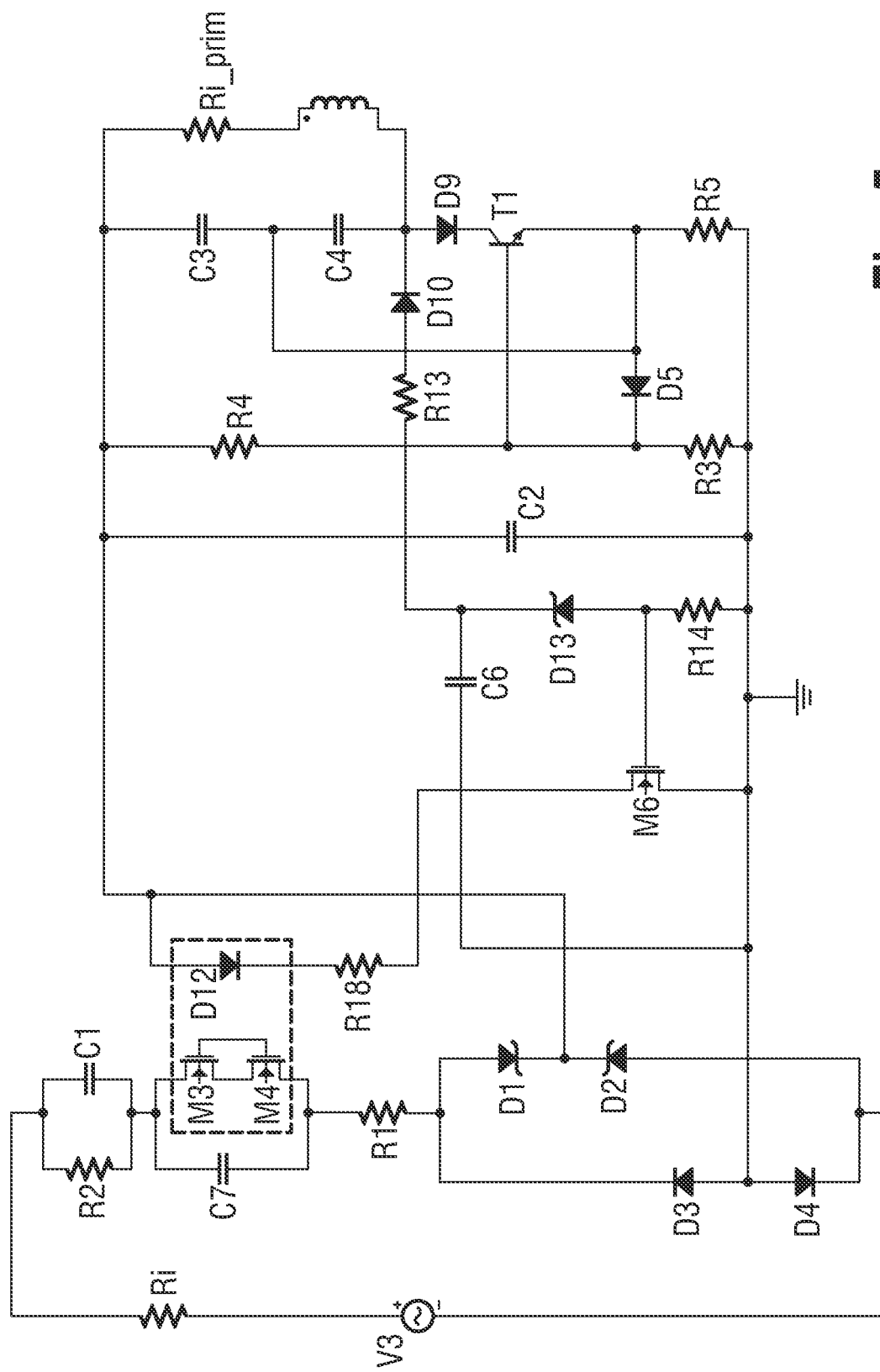
FIG. 5 shows a second circuit arrangement with Colpitts oscillator according to embodiments shown and described herein.
Figure 6:
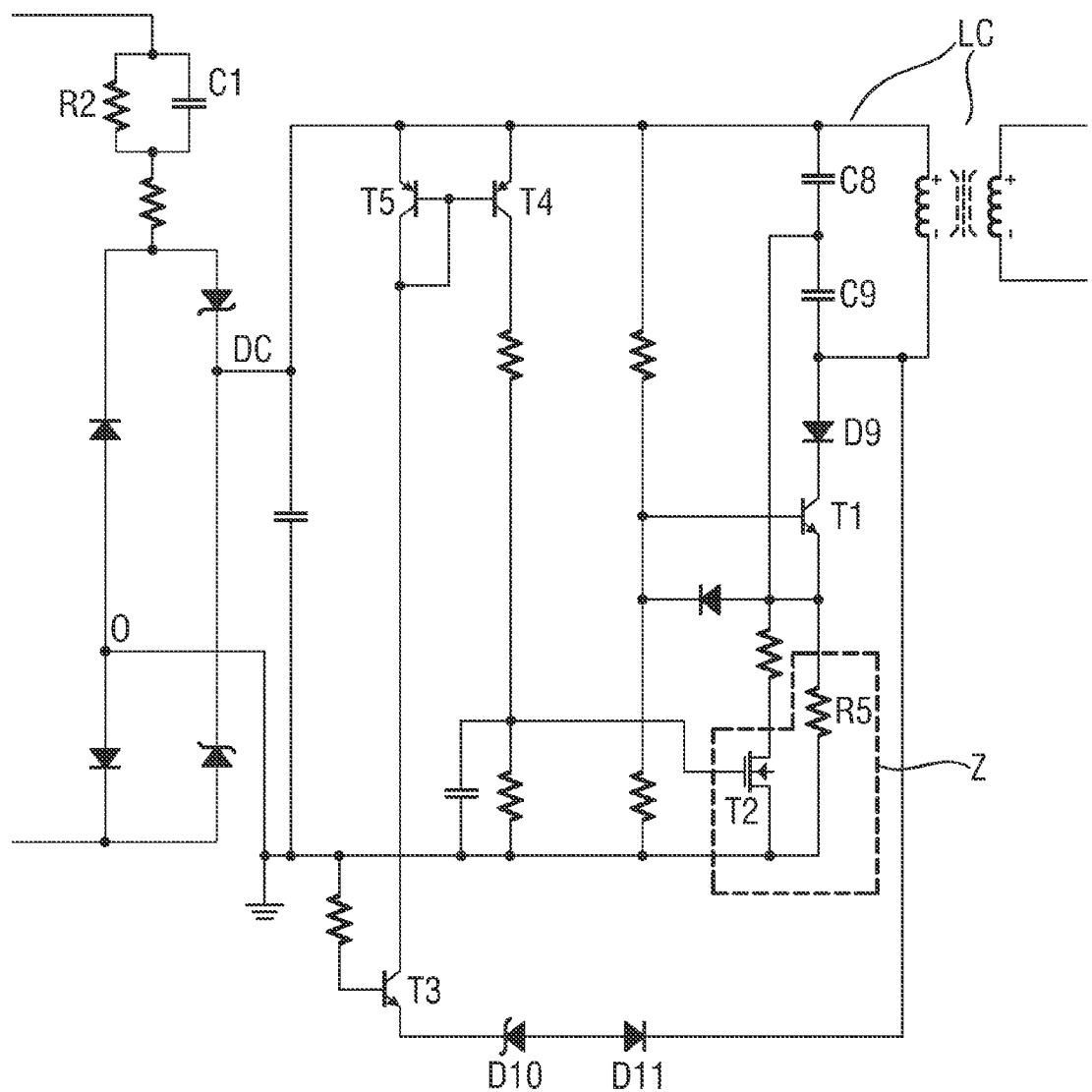
FIG. 6 shows a third circuit arrangement with a Colpitts oscillator according to embodiments shown and described herein.

Instead of the Hartley oscillator, another embodiment of the circuit arrangement described above uses a Colpitts oscillator and/or uses discrete circuits—instead of a microcontroller—to detect the load of the oscillator and to modify the complex input resistance of the power adaptor, for example as they are shown in FIGS. 4 through 6.

Figure 3:
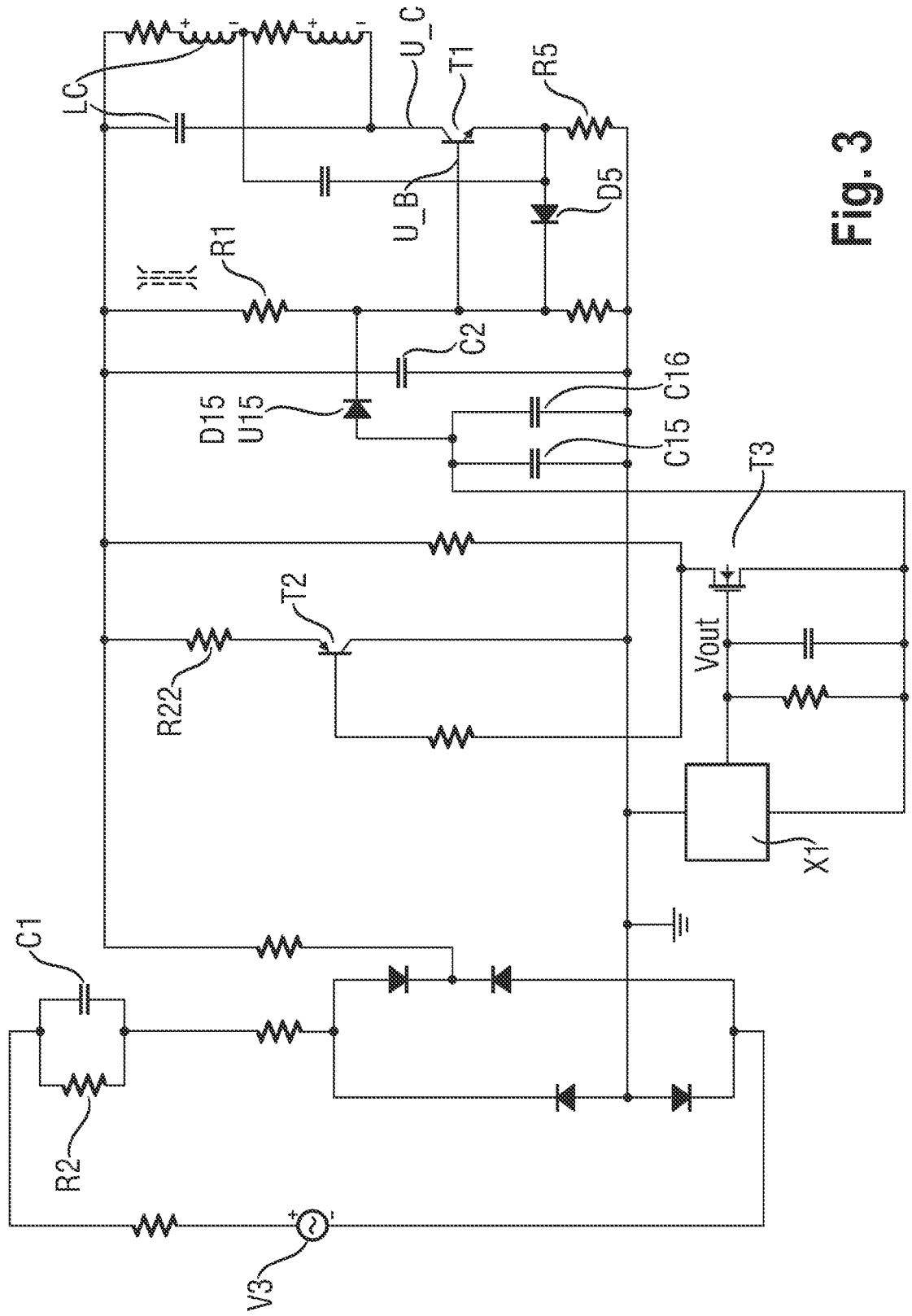
FIG. 3 shows a second circuit arrangement with a Hartley oscillator according to embodiments shown and described herein.

FIG. 3 shows a circuit arrangement with a Hartley oscillator that is supplied by a power adaptor with a capacitive series resistance C1. In one embodiment, a reset IC is present as a device X1 to detect the load of the oscillator. The reset IC only outputs a high level at its output Vout when its supply voltage exceeds a predetermined value. A switching threshold for a field effect transistor T3 to become conductive is set with the reset IC. The energy supply from the power adaptor into the oscillator is set by evaluating the base voltage of the transistor T1. For this, the negative base voltage of the transistor T1 is supplied to the reset IC via the diode D15. The base of the transistor T1 is coupled with the oscillating circuit via the emitter resistor R5 and the diode D5.

If the inductive load of the oscillator increases, the voltage at the base of the transistor T1 decreases. The diode D15 only allows a current flow when the voltage U15 is negative, thus when the base voltage at the transistor T1 is negative to ground. The reset IC draws its supply voltage via the diode D15. Capacitors C15 and C16 that are arranged between ground and the anode of the diode D15 set a time constant, with which changes of the base voltage affect the reset IC. The reset IC only outputs a high level at its output Vout when the negative half-wave of the base voltage of the transistor T1 falls below a predetermined value. The field effect transistor T3 (which for its part switches the transistor T2 to the conductive state) is activated with the level Vout. If the negative base voltage of T1 falls below a predetermined value, the output of the power adaptor is shorted with a comparably small resistance via the ohmic resistor R22. Due to the capacitive series resistance C1, the power adaptor now consumes almost exclusively a reactive power from the mains, and the oscillator LC receives only little electric energy from the power adaptor until the voltage at the capacitors C15 and C16 has declined to the point that the supply voltage of the reset IC has again fallen below a predetermined value. In standby operation, therefore, the oscillator alternately oscillates with a small amplitude or, respectively, a large amplitude.

FIG. 4 shows a circuit arrangement with a Colpitts oscillator that is supplied by a power adaptor with a capacitive series resistance C1. The device X1 for detecting the load of the oscillator includes a Zener diode D10 and a diode D11 that detects the negative voltage amplitude of the oscillation in the oscillator LC, namely at the collector of the transistor T1. In the unloaded state of the oscillator, the negative voltage amplitude is maximum in terms of magnitude (reference value). If the amplitude is less than the reference value, this is an indication of a stronger attenuation, thus of a higher power demand. In the case of the unloaded oscillator, the branch with the Zener diode D10 and the diode D11 is conductive, such that the transistor T4 is conductive. The transistors T3 and T5 may likewise be conductive when their base emitter voltages exceed a predetermined value in terms of magnitude. The two transistors T3 and T5 control the field effect transistor T2. If T2 is conductive, the output of the power adaptor is connected to ground via the ohmic resistor R22 (which has a predetermined, relatively small value), such that the supply voltage of the oscillator LC decreases and draws barely any more energy from the power adaptor. Due to the capacitive series resistance C1 (which has a high value in comparison to the ohmic resistor R22), the mains is loaded practically only with a reactive power (standby operation).

The diode D9 at the collector of the transistor T1 suppresses a possible return current flow in the reverse direction of the transistor T1, which would be borne by the diode branch D10, D11, thus supporting the ability to evaluate the negative voltage amplitude in the oscillator LC.

In the circuit arrangement shown in FIG. 5, the power adaptor comprises a complex input resistance whose capacitive portion may be varied depending on the load of the oscillator. The power adaptor includes a capacitive series resistance and a rectifier bridge with diodes D1, D2, D3, D4 that, together with a capacitor C2, generate from the alternating mains voltage a smoothed direct voltage with which the oscillator is operated. The capacitive series resistance has a capacitor C7 and a capacitor C1 with which a resistor R2 is wired in parallel. The resistor R2 ensures that the capacitor C1 is discharged after the power adaptor N has been disconnected from the mains V3. An electronic switch is wired in parallel with the capacitor C7, which electronic switch includes two transistors connected in series M3, M4 and is part of an optocoupler. The parallel wiring made up of capacitor C1 and resistor R2 is wired in series with the parallel wiring made up of capacitor C7 and the transistors M3, M4. The resistor R2 is relatively high-resistance in comparison to the non-reactive resistance of the capacitor C1. The complex input resistance of the power adaptor N is essentially defined by the capacitive resistance of the capacitor C1 when the electronic switch is closed or, respectively, by the capacitive resistance of the two capacitors C1 and C7 wired in series when the electronic switch is open.

If the circuit arrangement should be set into standby mode, the electronic switch is opened, meaning that the diode D12 of the optocoupler is deactivated. The non-reactive power consumption of the circuit arrangement from the mains is thereby reduced because the non-reactive resistance of the two capacitors C1, C7 wired in series is significantly greater than the non-reactive resistance of the capacitor C1. The power adaptor now consumes nearly only reactive power. In one embodiment, the capacitors C1, C7 are dimensioned so that in standby mode a voltage that is still sufficient to operate the oscillator arises at the capacitor C2, wherein this oscillator oscillates with only a reduced amplitude.

The oscillator included in the circuit arrangement is a Colpitts oscillator in common-base configuration, which Colpitts oscillator has a transistor T1 as an active element. To detect the loading of the oscillator by the secondary side, a circuit is provided that has two diodes D10, D13, two resistors R13, R14, a capacitor C6 and a switching transistor M6. The cathode of the diode D10 is connected with the collector of the transistor T1. The negative half-wave of the collector voltage U_C of the transistor T1 occurs at the anode of the diode D10. This voltage is representative of the load of the oscillator LC. Instead of the negative half-wave of the collector voltage, the negative half-wave of the base voltage U_B may also be evaluated. The anode of the diode D10 is connected via the resistor R13 with the one end of the capacitor C6 and the cathode of the diode D13. The other end of the capacitor C6 is connected to ground. The anode of the diode D13 is connected with the control terminal of the switching transistor M6 and to ground via the resistor R14. The contact gap of the switching transistor M6 is wired in series with the diode D12 of the optocoupler and at least one current limiting resistor R18.

The switching transistor M6 is only disabled when a sufficiently high negative voltage is applied at its control terminal. Given a low load of the oscillator, a sufficiently high negative voltage is supplied to the control terminal of the switching transistor M6 via the diodes D10 and D13 and the resistor R13, which has the result that the diode D12 of the optocoupler is deactivated, the transistors M3, M4 of the electronic switch are disabled and the complex input resistance assumes a high value.

Instead of the optocoupler and capacitor C7, another embodiment of the circuit arrangement described above uses a series circuit made up of a transistor T2 and a resistor R22 parallel to the capacitor C2 (as is shown in FIG. 2) or a switchable emitter resistor in the oscillator (as is shown in FIG. 6) to vary the complex input resistance of the power adaptor.

FIG. 6 shows a further circuit arrangement with a Colpitts oscillator in common-base configuration, which circuit arrangement is designed to detect the negative voltage amplitude of the oscillation in the oscillator LC. If the negative voltage amplitude exceeds a predetermined value in terms of magnitude—thus in the case of the unloaded oscillator LC—a branch with a Zener diode D10 and a diode D11 becomes conductive and a transistor T3 is conductive. The transistors T4 and T5 may likewise be conductive when their base emitter voltages exceed a predetermined value in terms of magnitude. The two transistors T4 and T5 control a field effect transistor T2 whose contact gap is wired in parallel with an emitter resistor R5. If T2 is conductive, the non-reactive resistance Z at the emitter of the transistor T1 is relatively low, such that the energy supply in the oscillator LC is maximum. However, the capacitive series resistance C1 of the power adaptor is not designed for such a high power, such that the output voltage of the power adaptor—and therefore the non-reactive power consumption of the circuit arrangement—is reduced because the output of the power adaptor is now terminated with a comparably low resistance.

If the negative voltage amplitude decreases in terms of magnitude in comparison to a reference value that is determined by the Zener diode D10, this is an indication of a stronger attenuation, thus of a higher power demand at the secondary side. The transistor T2 is disabled and the non-reactive resistance Z at the emitter is comparatively high. This is the operating state of the circuit arrangement in which the power consumption of the oscillator is matched to the capacitive series resistance C1 of the power adaptor and maximum power is transmitted to the secondary.

A diode D9 at the collector of the transistors T1 suppresses a possible return current flow in the reverse direction of the transistor T1 which would be borne by the diode branch D10, D11, thus supports the ability to evaluate the negative voltage amplitude in the oscillator LC.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A circuit arrangement for the inductive transfer of energy comprising:
    an oscillator;
    a device for detecting the load of the oscillator and for setting the circuit arrangement into one of multiple operating states depending on the detected load;
    wherein the device determines the load of the oscillator using an electrical variable occurring in the oscillator, wherein the device has a comparator that compares the detected load with a reference value, wherein the comparator is realized by a reset IC; and
    a power adaptor supplying the oscillator with energy and having complex input resistance that may be varied by a controllable switch.

2. The circuit arrangement according to claim 1, wherein the oscillator is at least one of a Colpitts oscillator or a Hartley oscillator, the oscillator having an active element.

3. The circuit arrangement according to claim 2, wherein the device evaluates a voltage at a terminal of the active element as the electrical variable.

4. The circuit arrangement according to claim 2, wherein the active element is a transistor that is operated in common-base configuration, such that the electrical variable is a voltage at the collector or at the base of the transistor.

5. The circuit arrangement according to claim 4, wherein the device evaluates the amplitude or the mean value of a negative voltage at the collector or at the base of the transistor.

6. The circuit arrangement according to claim 1, wherein the comparator is implemented in a microcontroller.

7. The circuit arrangement according to claim 1, wherein the comparator is a Zener diode.

8. The circuit arrangement according to claim 6, wherein the device activates a controllable switch as necessary depending on the result of the comparison, which controllable switch switches the circuit arrangement from a standby mode into an operating mode or vice versa.

9. The circuit arrangement according to claim 8, wherein the oscillator has a damping element whose resistance can be switched by the controllable switch.

10. The circuit arrangement according to claim 8, wherein the supply voltage of the oscillator may be varied by the controllable switch.

11. The circuit arrangement according to claim 1, wherein a diode is provided between an oscillating circuit of the oscillator and the active element.

12. A circuit arrangement for the inductive transfer of energy comprising:

an oscillator a power adaptor supplying the oscillator with energy and having complex input resistance that may be varied by a controllable switch; and a device for detecting the load of the oscillator and for setting the circuit arrangement into one of multiple operating states depending on the detected load;

wherein the device determines the load of the oscillator using an electrical variable occurring in the oscillator, wherein the device has a comparator that compares the detected load with a reference value, wherein the comparator is implemented in a microcontroller, and wherein the device activates the controllable switch as necessary depending on the result of the comparison, which controllable switch switches the circuit arrangement from a standby mode into an operating mode or vice versa.

13. The circuit arrangement according to claim 12, wherein the oscillator has a damping element whose resistance can be switched by the controllable switch.

14. The circuit arrangement according to claim 12, wherein the supply voltage of the oscillator may be varied by the controllable switch.

\* \* \* \* \*